United States Patent
Tanach et al.

(10) Patent No.: US 7,406,341 B2
(45) Date of Patent: Jul. 29, 2008

(54) RECEIVE-AWARE POWER SAVING IN A WIRELESS COMMUNICATIONS DEVICE

(75) Inventors: Moshe Tanach, Portland, OR (US); Ron Nevo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 431 days.

(21) Appl. No.: 11/067,077

(22) Filed: Feb. 25, 2005

(65) Prior Publication Data

US 2006/0194623 A1 Aug. 31, 2006

(51) Int. Cl.
*H04Q 7/20* (2006.01)
(52) U.S. Cl. ............... 455/574; 455/11.1; 455/127.1
(58) Field of Classification Search ......... 455/127.1, 455/11.1, 574, 572, 522; 370/311
See application file for complete search history.

(56) References Cited

U.S. PATENT DOCUMENTS

2005/0136833 A1* 6/2005 Emeott et al. ........... 455/11.1
2006/0009174 A1* 1/2006 Dunn .................. 455/127.1

OTHER PUBLICATIONS

Tanach, "Idle State Management", U.S. Appl. No. 11/018,561, filed Dec. 21, 2004.
Stephens, "Power Saving When Using Aggregated Packets", U.S. Appl. No. 11/067,077, filed Feb. 25, 2005.

* cited by examiner

*Primary Examiner*—Vincent P. Harper
*Assistant Examiner*—Phuoc Doan
(74) *Attorney, Agent, or Firm*—Alan Pederson-Giles

(57) ABSTRACT

A wireless communications device may reduce power consumption by determining that a received communications sequence is not addressed to the wireless communications device, determining how long the communications sequence will last, and placing its own receive circuitry into a low power state until the communications sequence has ended.

16 Claims, 3 Drawing Sheets

RECEIVE-AWARE POWER SAVING IN A WIRELESS COMMUNICATIONS DEVICE

BACKGROUND

Due to the proliferation of battery powered wireless communications devices, and the constant pressure to do more computing in smaller devices, extending battery life for as long as possible in these devices has become an important goal in the industry. Various techniques have been developed to reduce power consumption by placing all or part of the battery powered wireless communications device into low power modes under certain circumstances. Because the transmit operation generally creates the biggest drain on power, much of this effort has been directed to reducing power consumption that is tied to transmit operations. But other operations have been comparatively neglected in this effort.

BRIEF DESCRIPTION OF THE DRAWINGS

The invention may be understood by referring to the following description and accompanying drawings that are used to illustrate embodiments of the invention. In the drawings.

DETAILED DESCRIPTION

Figure 1:
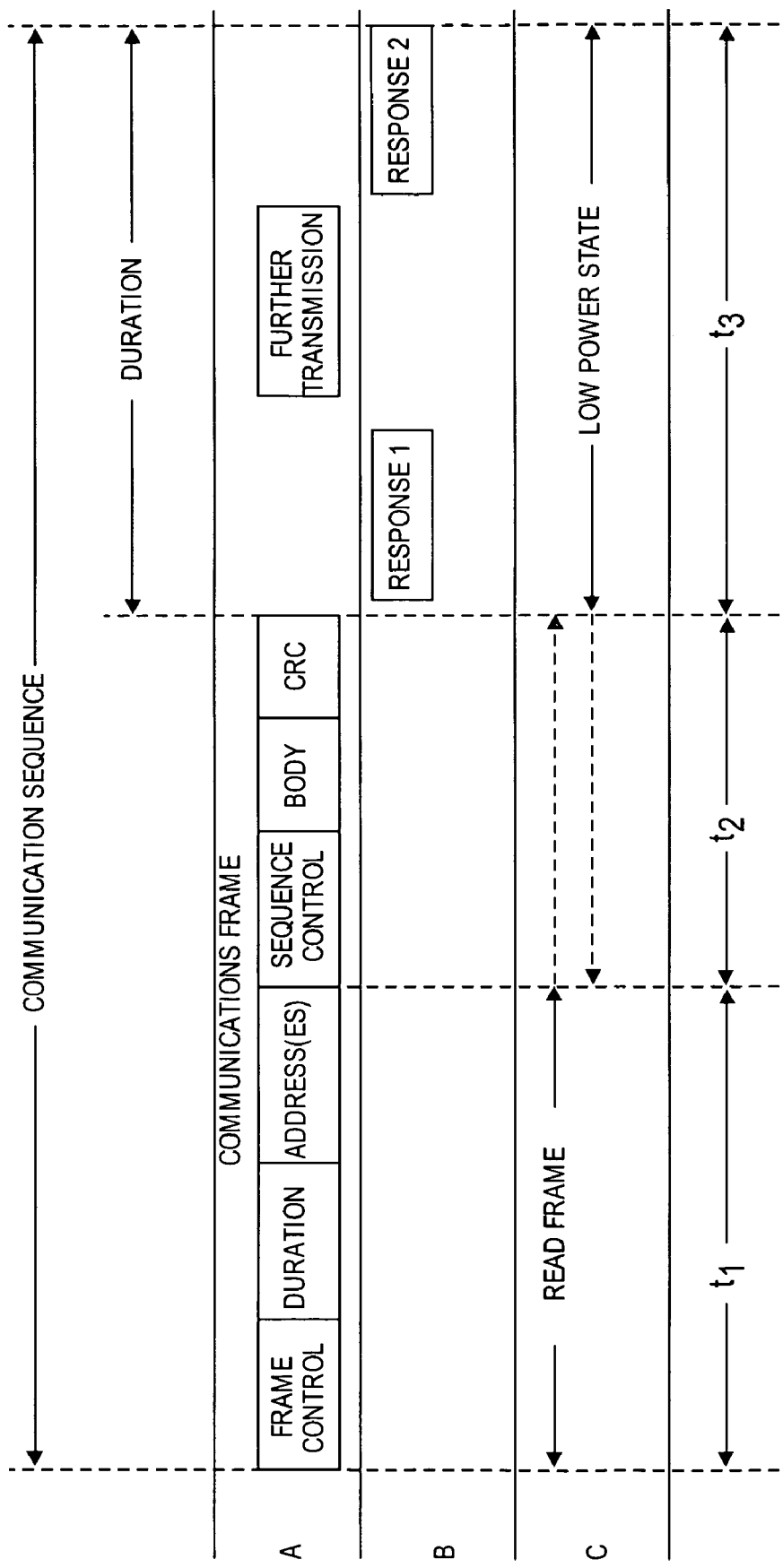
FIG. 1 shows a communications sequence, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, the different embodiments described my have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other through physical or electrical means, but they may or may not be in direct physical or electrical contact.

The term "processor" may refer to any device or portion of a device that processes electronic data from registers and/or memory to transform that electronic data into other electronic data that may be stored in registers and/or memory. A "computing platform" may comprise one or more processors.

The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The term "mobile wireless communications device" may be used to describe a wireless communications device that is designed to continue communicating while it, and/or the device it is communicating with, are physically moving with respect to each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or a combination of hardware, firmware, and software. The invention may also be implemented as instructions stored on a machine-readable medium, which may be read and executed by a computing platform to perform the operations described herein. A machine-readable medium may include any mechanism for storing, transmitting, or receiving information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces and/or antennas that transmit and/or receive those signals, etc.), and others.

Various embodiments of the invention may place receive circuitry in a low-power state during reception of a communications sequence that is not addressed to the device containing the receive circuitry. Such an embodiment may use timing information to stay in the low power state approximately until the end of the communications sequence, and then be restored to an operational state in time to monitor for other communications. In some embodiments the timing information may be contained in the communications sequence. The low power state may be used to reduce consumption of battery power.

FIG. 1 shows a communications sequence, according to an embodiment of the invention. Row A shows the format of wireless transmissions from a wireless communications device A, such as but not limited to an access point (AP) or other form of base station. The first portion shows possible elements of an initial communications frame, although other embodiments may contain more, fewer, and/or different elements than shown. The transmissions from device A also include a Further frame, which may occur at a time subsequent to the initial communications frame. Both the initial communications frame and one or more Further frames may contain the same destination address in the Address field, indicating the frames are intended for a second wireless communications device, and therefore constitute a communications sequence between the first device and the second device. Although the description of FIG. 1 may refer to "a" second wireless communication device, in some embodiments the communications sequence may be addressed to multiple devices. In some embodiments the communications sequence may use various types of addresses, such as one or more unicast, multicast, or broadcast addresses. Regardless of the type of addressing used, if an embodiment of the invention can determine that the communications sequence is not addressed to it, or that it has no need to receive the remainder of the communications sequence, it may follow the power saving techniques described herein.

The duration field may contain timing information that indicates how long the communications sequence will last, so that various receiving devices may determine when the communications sequence will end. In some embodiments the indicated Duration time may measured from the end of the initial communications frame, but in other embodiments the Duration time may be measured from any other feasible point. Other elements are also shown in various fields, such as Frame Control, Sequence Control, Body, and CRC, because these fields appear in commonly used communications formats, but these are shown for example only, and the embodiments of the invention are not limited to the illustrated format.

Row B shows responses from one or more wireless communications devices B that the transmissions of Row A are addressed to. The responses may have various formats, which are not shown to avoid obscuring an understanding of the various embodiment of the invention. Although two transmissions from wireless communications device A and two responses from wireless communications device(s) B are shown, other quantities may be used in the communications sequence. In some embodiments, multiple addressed devices may respond separately (e.g., the first response may be by one device, the second response by another device, etc., all falling within the time indicated in the duration field).

Row C shows activities performed by a wireless communications device C that is not addressed by the frames of Row A. Wireless communications device C may receive and decode the initial portion of the initial frame from device A during a time period $t_1$. This time period may be long enough to decode the destination address field and the duration field, but may also be longer than that. After determining that this sequence is not addressed to wireless communications device C (or in some embodiments that wireless communications device C will ignore the sequence for other reasons), device C may place all or a portion of its receive circuitry into a low power state during time period $t_3$. This low power state may end, and the receive circuitry returned to an operational state, approximately at the end of the communications sequence, as determined by the contents of the duration field.

Time period $t_2$ indicates a time period in which device C may continue monitoring, may perform processing, may place the receive circuitry into a low power state, or any combination thereof, depending on the embodiment. In various embodiments device C may enter the low power state at various points within time period t2. In some embodiments the low power state may begin as soon as the Duration and Address fields have been interpreted, as indicated by the end of time period $t_1$. In other embodiments the low power state may not begin until the entire initial frame has been received, as indicated by the end of time period $t_2$. (For example, device C may monitor the entire initial frame to see if the initial frame has been corrupted, as indicated by a CRC error.) In still other embodiments device C may enter the low power state at other particular points within time period $t_2$. (For example, the initial communications frame may contain fields having additional information of interest to the third wireless communications device, even though the frame is not addressed to the third wireless communications device.)

Figure 2:
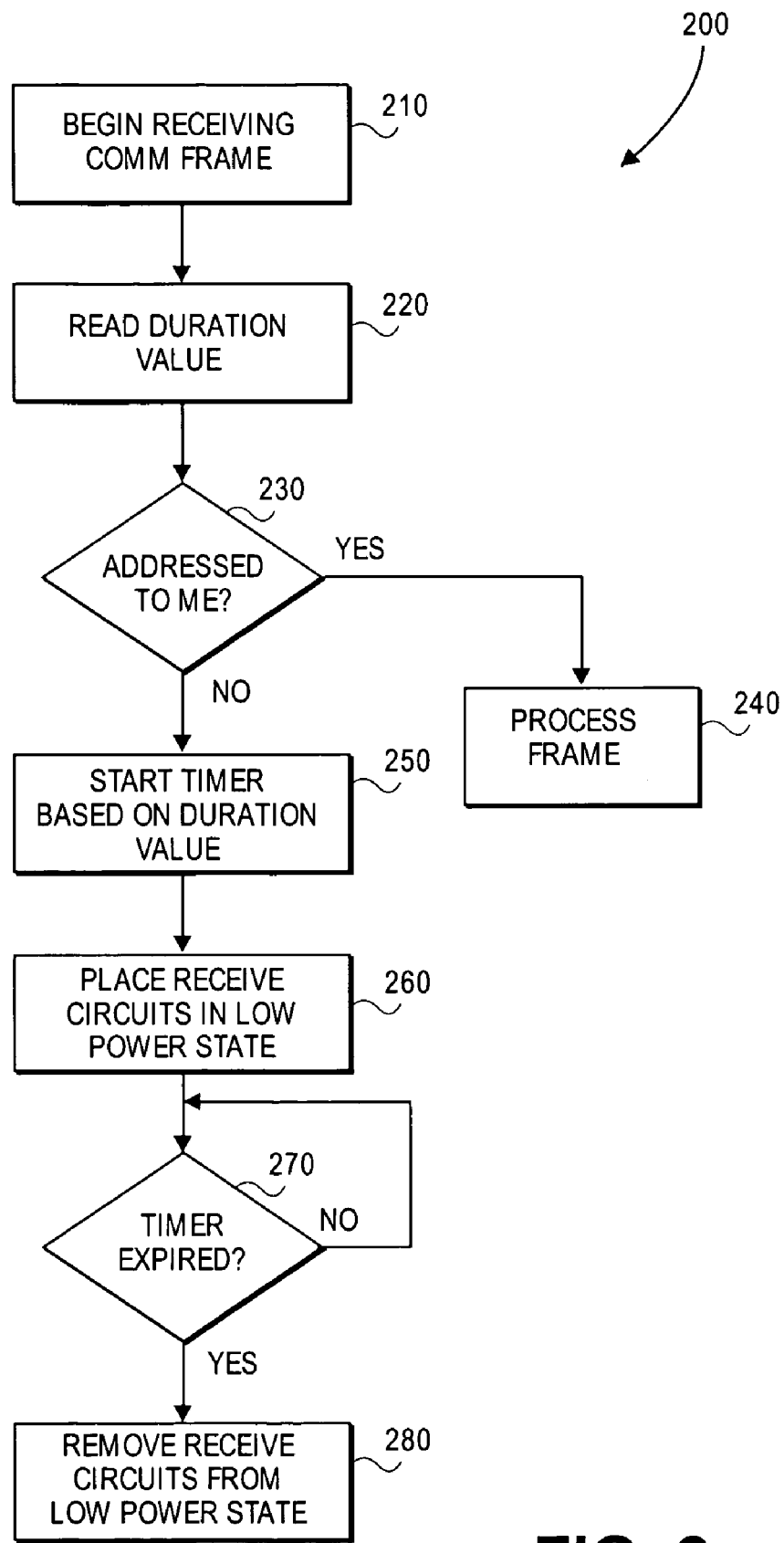
FIG. 2 shows a flow diagram of a method, according to an embodiment of the invention.

FIG. 2 shows a flow diagram of a method, according to an embodiment of the invention. Flow diagram 200 illustrates operations that may be performed by an embodiment of the wireless communications device C previously described for FIG. 1. At 210, the device may begin receiving an initial communications frame in a communications sequence. At 220 the duration value may be read from the frame. If the frame is addressed to device C, as determined at 230, then the remainder of the frame may be processed at 240 in a manner that is beyond the scope of this document. However, if the frame is not addressed to device C, or if the frame may be ignored by device C for some other reason, processing may continue at 250. Although the flow diagram shows the duration field being read before the address decision is made, other embodiments may reverse this order, possibly depending on the order in which those two fields are placed in the initial frame.

At 250 a time value may be placed into a timer and the timer started, the time value based on the contents read from the duration field. In some embodiments this time value may be the direct contents of the duration field, while in other embodiments this time value may merely be derived from the contents of the duration field. In some embodiments, such as but not limited to applications in which the low power state is entered before the initial frame has been completely received, the time value may also be based on the time remaining until the initial frame has been received, information which may also be located within the initial frame. In still other embodiments, the timer may not be started until the initial frame has been received, a time which may in turn be indicated by a separate timer. In any case, the timer may be set to expire at approximately the time that the communications sequence is expected to end.

Figure 3:
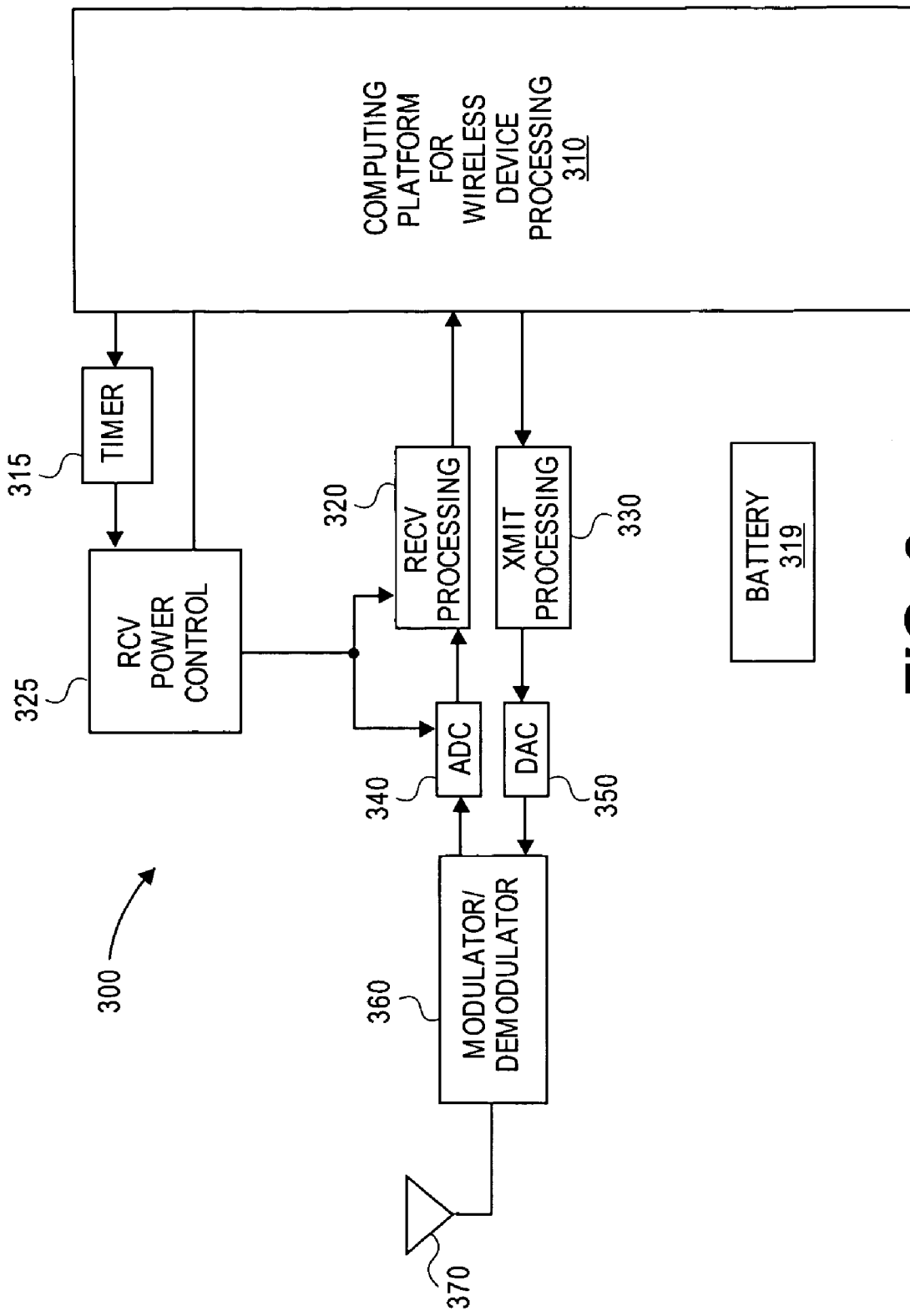
FIG. 3 shows a block diagram of a wireless communications device, according to an embodiment of the invention.

FIG. 3 shows a block diagram of a wireless communications device, according to an embodiment of the invention. In the illustrated embodiment, wireless communications device 300 may include a modulator/demodulator 360 to convert analog signals to modulated radio frequency signals for transmission through the antenna(s) 370, and to convert modulated radio frequency signals received from the antenna(s) 370 to analog signals. The antenna(s) may be one or more of any feasible type of antenna, such as but not limited to a dipole antenna. Device 300 may also include an analog-to-digital converter (ADC) 340 to digitize the analog signals from the modulator/demodulator 360, and additional circuitry 320 to process the digitized receive data from the ADC. Device 300 may also include circuitry 330 process data from the computing platform 310 before presenting that data to digital-to-analog (DAC) converter 350. In some embodiments, circuits 320 and/or 330 may comprise at least one digital signal processor (DSP).

Computing platform 310 may provide for overall computing for wireless communications device 300. Such computing may comprise any or all of, but is not limited to: 1) applications processing, 2) data management, 3) overall power control strategy, 4) peripheral control, 5) etc. Wireless communications device 300 may also comprise receive power control circuitry 325 to provide power control to some of the receive circuitry, and timer 315 to regulate how long the receive circuitry is to be in a low power state. Although the illustrated embodiment shows a particular configuration of the components described, other embodiments may provide the same functionality with different configurations. Although the illustrated embodiment shows receive power control circuitry 325 as controlling power in both the ADC 340 and the processing circuitry 320, other embodiments may have circuitry 325 provide power control for more or fewer circuits (e.g., provide power control for ADC 340 but not for a DSP that might provide the functionality of processing circuitry 320).

A low power state in applicable portions of the receive circuitry may be provided through any feasible means, such as but not limited to any of the following: 1) lowering the frequency of a circuit clock, 2) stopping the circuit clock, 3) lowering the supply voltage, 4) disconnecting the supply voltage, 5) etc. Similarly, the timer 315 may be implemented through any feasible means, such as but not limited to any of the following: 1) a digital circuit counter, 2) execution of software or firmware, 3) shared use of a counter also used for other purposes, 4) etc. In addition to the described techniques, other techniques that are not described may also be used, such as but not limited to: 1) providing power control for transmit circuitry, 2) providing power control for circuitry that is not directly involved in receive or transmit operations, 3) sharing power control for multiple circuitry, such as for receive and transmit circuitry at the same time.

In the illustrated embodiment, wireless communications device 300 may also comprise a battery 319, which may be used to power any or all portions of the circuitry of wireless communications device 300. As used here, the term 'battery' may include any self-contained power source, such as but not limited to: 1) a conventional chemical battery, 2) a solar power cell, 3) any portable power source currently available or yet to be developed that may feasibly be carried with a mobile wireless communications device, 4) etc.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus, comprising a first wireless communications device adapted to:
    receive, from a second wireless communications device, at least a portion of a first communications frame that is not addressed to the first wireless communications device;
    determine a time period that will end approximately when a communications sequence containing the first communications frame and not containing any other communications frames addressed to the first wireless communications device is to end;
    place receive circuitry in the first wireless communications device into a low power state; and
    remove the receive circuitry from the low power state approximately at the end of the time period.

2. The apparatus of claim 1, wherein the first wireless communications device is adapted to place the receive circuitry into the low power state after an end of the first communications frame is received.

3. The apparatus of claim 1, wherein the first wireless communications device is adapted to place the receive circuitry in the low power state before an end of the first communications frame is received.

4. The apparatus of claim 1, wherein the time period is determined from a duration field in the first communications frame.

5. The apparatus of claim 1, wherein said placing comprises placing an analog-to-digital converter in the low power state.

6. The apparatus of claim 1, further comprising a dipole antenna coupled to the receive circuitry to receive the portion from the second wireless communications device in a form of modulated electromagnetic radiation.

7. The apparatus of claim 1, further comprising a battery coupled to the receive circuitry to power the receive circuitry during an operational mode.

8. A method, comprising:
    receiving by a receiving wireless communications device at least a portion of a wireless communications sequence that is addressed to another wireless communications device and that is not addressed to the receiving wireless communications device;
    determining by the receiving wireless communications device a time period that will end approximately when the wireless communications sequence is to end;
    placing receive circuitry in the receiving wireless communications device into a low power state; and
    exiting the low power state of the receive circuitry in the receiving wireless communications device approximately at the end of the time period.

9. The method of claim 8, wherein said placing comprises placing the receive circuitry into the low power state after receipt of an end of an initial frame in the communications sequence.

10. The method of claim 8, wherein said placing comprises placing the receive circuitry into the low power state before receipt of an end of an initial frame in the communications sequence.

11. The method of claim 8, wherein said determining comprises determining the time period from a duration field in an initial frame in the communications sequence.

12. The method of claim 8, wherein said placing comprises placing at least one analog-to-digital converter into the low power state.

13. An article comprising
    a tangible computer-readable medium that provides instructions, which when executed by a computing platform, cause said computing platform to perform operations comprising:
    receiving at least an initial portion of a frame of a wireless communications sequence;
    determining that the frame is not addressed to a wireless communications device that is performing the operation of receiving;
    reading a duration value from the frame;
    starting a timer based on the duration value;
    placing receive circuitry into a low power state; and
    removing the receive circuitry from the low power state upon an expiration of the timer.

14. The article of claim 13, wherein said placing comprises placing the receive circuitry into the low power state after receipt of an end of the frame.

15. The article of claim 13, wherein said placing comprises placing the receive circuitry into the low power state before receipt of an end of the frame.

16. The article of claim 13, wherein said placing comprises placing an analog-to-digital converter into the low power state.

* * * * *